United States Patent Office 3,513,236
Patented May 19, 1970

3,513,236
5 - [(ARYLDEHYDROPIPERIDINYL- AND ARYLDE-HYDROPYRROLIDINYL) - LOWER - ALKYL] - 2-OXAZOLIDINONES IN TRANQUILIZING COMPOSITIONS AND METHODS
Carl D. Lunsford and William J. Welstead, Jr., Richmond, Va., assignors to A. H. Robins Company, Incorporated, Richmond, Va., a corporation of Virginia
No Drawing. Original application June 13, 1966, Ser. No. 556,872. Divided and this application Aug. 26, 1968, Ser. No. 755,370
Int. Cl. A61k 27/00
U.S. Cl. 424—267                                24 Claims

ABSTRACT OF THE DISCLOSURE

5-[(Aryldehydropiperidinyl- and aryldehydropyrrolidinyl)-lower-alkyl]-2-oxazolidinones compositions and method of treating therewith. Useful as major tranquilizers.

---

This is a division of application Ser. No. 556,872, filed June 13, 1966 now Pat. No. 3,455,741.

The present invention relates to 5-(substituted loweralkyl)-2-oxazolidinones, and is more particularly concerned with certain 5-[(aryldehydropiperidinyl- and aryldehydropyrrolidinyl)-lower-alkyl]-2-oxazolidinones, compositions thereof, and the production and the use of the same. Of special interest are compounds designated 5-[2-(3- and 4-phenyl-3,4-dehydropiperidinyl)-ethyl]-2-oxazolidinones, the corresponding 5-[2-(3-phenyl-3,4-dehydropyrrolidinyl)-ethyl]-2-oxazolidinones, and acid addition salts thereof.

The invention is especially concerned with 5-[(3- and 4-phenyldehydropiperidinyl- and 3-phenyldehydropyrrolidinyl)-lower-alkyl]-2-oxazolidinones having the formula:

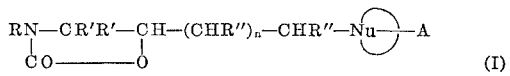
(I)

wherein n is 1 or 2,
wherein R is preferably hydrogen or lower-alkyl, but may also be cycloalkyl, phenylalkyl, or substituted phenylalkyl,
wherein R' is hydrogen or methyl, preferably hydrogen,
wherein R'' is hydrogen or methyl, preferably hydrogen,
wherein

is a heterocyclic ring selected from 2,3-dehydropyrrolidinyl, 3,4-dehydropyrrolidinyl, 2,3-dehydropiperidinyl, and 3,4-dehydropiperidinyl,
wherein A is phenyl or substituted phenyl attached to a carbon atom of the ring double bond and in the 3 or 4 position of the heterocyclic ring, remaining valences of the carbon atoms of the heterocyclic ring being satisfied by hydrogen and zero through four methyl groups, and acid addition salts thereof. Since cis-trans geometric isomerism can exist, due to the presence of the heterocyclic ring, the foregoing formula and the present invention is intended to include and cover individual isomers of the compounds as well as isomeric mixtures thereof.

The compounds of Formula I are primarily useful as major tranquilizers. Compounds which block aggressive behavior in fighting mice may be classified as major tranquilizers [Yen, C.Y., et al., Arch. Int. Pharmacodn. 123, 179 (1959)]. The compounds of the present invention possess this property to a high degree and are therefore classified as such.

It is accordingly an object of the present invention to provide novel and useful compounds, compositions thereof, methods of producing the same, and methods for the utilization thereof. Additional objects will become apparent hereinafter and still others will be apparent to one skilled in the art.

In the definition of symbols in the formulas hereof and where they appear elsewhere throughout this specification, the terms have the following significance.

A "substituted phenyl" radical is a phenyl radical substituted by any radical or radicals which are not reactive or otherwise interfering under the conditions of reaction, such as nitro, lower-alkoxy, lower-alkylmercapto, lower-alkyl, di-lower-alkylamino, hydroxy, trifluoromethyl, halo, and the like. The substituted phenyl radicals have preferably no more than one to three substituents such as those given above and, furthermore, these substituents can be in various available positions of the phenyl nucleus and, when more than one substituent is present, can be the same or different and can be in various position combinations relative to each other. The lower-alkyl, lower-alkoxy, lower-alkylmercapto, and di-lower-alkylamino substituents each have preferably from one to four carbon atoms which can be arranged as straight or branched chains. A total of nine carbon atoms in all ring substituents, making a total of fifteen carbon atoms in the radical, is the preferred maximum. The term "lower-alkyl" as used herein includes straight and branched chain radicals of up to eight carbon atoms inclusive, preferably no more than six carbon atoms, and is exemplified by such groups as methyl, ethyl, propyl, isopropyl, butyl, sec. butyl, tertiary butyl, amyl, isoamyl, hexyl, heptyl, octyl, and the like. A "lower-alkoxy" group has the formula lower-alkyl—O—. The term "cycloalkyl" as used herein includes primarily cyclic alkyl radicals containing three up to nine carbon atoms inclusive and encompasses such groups as cyclopropyl, cyclobutyl, cyclohexyl, cyclopentyl, methylcyclohexyl, propylcyclohexyl, ethylcyclopentyl, propylcyclopentyl, dimethylcyclohexyl, cycloheptyl, and cyclooctyl. Included in the term "phenylalkyl" are lower-alkyl substituted monocarbocyclic aryl groups such as benzyl, phenethyl, methylbenzyl, phenpropyl, and the like. "Substituted phenylalkyl" groups may contain all of the substituents and variations thereof of already disclosed for a "substituted phenyl" radical. When halogen is referred to herein, preferably but not necessarily a halogen of atomic weight not greater than eighty is employed. Of the halogens, chlorine and fluorine are preferred.

METHOD OF PREPARATION

The compounds of the foregoing Formula I may be prepared according to the following general scheme:
A starting oxazolidinone compound of the formula:

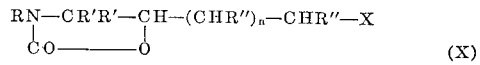
(X)

wherein R, R', and R'' have the meanings assigned in Formula I, n is 1 or 2, and X is a halogen atom, is reacted in a conventional halogen displacement reaction with a compound of the formula:

(XI)

wherein

is the remainder of the molecule which is desired to be introduced into the alkyl chain at the 5 position of the oxazolidinone ring, to split out a hydrogen halide.

A further procedure for preparing the compounds of the present invention (I) comprises the step of dehydrating a compound of the formula:

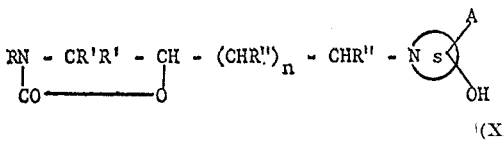

(XX)

wherein R, R', and R" all have the values previously assigned, wherein

is a saturated heterocyclic ring selected from pyrrolidinyl and piperidinyl, wherein A is phenyl or substituted phenyl, attached to a carbon atom in the 3 or 4 position of the heterocyclic ring, wherein OH is attached to the same carbon atom as A, the remaining valences of the carbon atoms of the heterocyclic ring being satisfied by hydrogen and zero through four methyl groups, at least one of the ring carbon atoms adjacent the carbon atom bearing the A and OH groups having at least one hydrogen atom attached thereto, with an acid to cause splitting out of water and formation of a compound having the Formula I hereinbefore given. These starting compounds are prepared from the corresponding saturated hydroxy cyclic amine and the selected 5-(2-haloalkyl)-2-oxazolidinone (X), also according to the conventional halogen replacement reaction. Further details of both the halogen replacement and hydrolysis procedures will be given hereinafter.

In the event R in Formula XX is benzyl, the R group may if desired be converted from benzyl to hydrogen with an alkali metal, e.g., sodium, and liquid ammonia. The procedure of this step may be generally described as a process for the production of a starting compound of Formula XX, wherein R is hydrogen, and acid addition salts thereof, which comprises the step of subjecting a starting compound of said Formula XX, wherein R is a benzyl radical, to debenzylation.

Starting compound X is provided in any one of a variety of ways. It is preferable provided by reacting a 3-pyrrolidinol with phosgene and then subjecting the intermediate reaction product to reaction with a tertiary amine, e.g., pyridine or other tertiary heterocyclic amine, dimethylaniline or other dialkylarylamine, or triethylamine or other trialkylamine, to produce the desired starting 5-(haloalkyl)-oxazolidinone (X). This novel procedure has proved to be of great value in the convenient production of compounds of Formula X from readily available 3-pyrrolidinol starting materials, and is adaptable to considerable variations in the molecule. The starting 3-pyrrolidinols wherein R' and R" are other than hydrogen may be obtained by the procedure of Ryan et al., J. Org. Chem. 27, 2901–2905 (1962) or according to Lunsford U.S. Pat. 2,830,997 and other sources cited therein.

5-HALOALKYL-2-OXAZOLIDINONE PRODUCTION

As a general procedure for this reaction, the following is representative:

A solution of 1–1.25 parts of carbonyl dihalide, e.g., phosgene (carbonyl dichloride) or carbonyl dibromide, dissolved in chloroform, toluene, benzene, tetrahydrofuran, or other nonreactive organic solvent is prepared in a suitable container such as a three-neck, round-bottom flask equipped with mechanical stirrer, dropping funnel, pot thermometer and condenser, and to this solution is added one part of the properly substituted 3-pyrrolidinol.

The reaction mixture is cooled in an ice bath and the addition is at such a rate that the pot temperature is kept between zero and 25° C. or with sufficient cooling to control the exothermic reaction. After the addition of 3-pyrrolidinol is complete, stirring is continued at the above temperature for one-half to one hour. Then, with continued cooling and stirring, two parts of a tertiary amine such as pyridine or other tertiary heterocyclic amine, dimethylaniline or other dialkylarylamine, or triethylamine or other trialkylamine, is added and the mixture allowed to warm to room temperature. The solution is extracted with dilute acid, then dilute base, and finally with water. The organic layer is dried over sodium sulfate or other suitable drying agent and the solvent removed at reduced pressure. The residual neutral material may then either be distilled in vacuo or purified by crystallization from a non-polar organic solvent. The yield of the purified product ranges from approximately 25–70% of the calculated amounts. Preparations I–X should be consulted for further particulars and details.

HALOGEN REPLACEMENT

The halogen of the starting 5-(2-haloalkyl)-2-oxazolidinones (Formula X) may be replaced by reaction of the selected starting compound with any one of various reactants

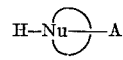

as already indicated previously.

Compounds of Formula X wherein X is halogen other than chlorine may also be employed and are prepared by allowing the chloro compound to react with halide salts such as sodium iodide or bromide in an appropriate solvent such as acetone or methylethyl ketone.

To replace the halogen in a compound of Formula X with the selected amine

the haloalkyl ozazolidinone (X) may be heated at reflux either with a large excess of the appropriate amine or with a small excess of the amine in an appropriate solvent such as ethanol. The time required for these reactions usually ranges from about 3 to 18 hours. The solvent or excess amine may then be removed at reduced pressure and the residue partitioned between chloroform and dilute aqueous base. The chloroform solution may be dried over an appropriate drying agent such as sodium sulfate and the solvent removed at reduced pressure. Salts of the residual amine may then be prepared by dissolving the free base in an appropriate solvent such as alcohol and adding an acid such as anhydrous hydrochloric acid, maleic acid, or fumaric acid.

In general, the 5-(aminoalkyl)-2-oxazolidinone compounds are prepared by heating a solution of the selected 5-(2-haloalkyl)-2-oxazolidinone and the selected amine in a suitable reaction solvent, e.g., ethanol, a higher boiling alcohol such as butanol, a hydrocarbon solvent such as toluene, or the amine itself may be the solvent in some cases. A reaction temperature from about room temperature to about 120° C. is usually employed, preferably 100 to 120° C., and a reaction period of about eight to twenty-four hours is usually adequate. Higher reaction temperatures increase the speed of reaction, while temperatures below 100° C. frequently require undesirably lengthy reaction periods. The amine may be employed in excess, or an inorganic base such as potassium carbonate can be used as a hydrogen acceptor. The resulting solution of the amine reaction product is concentrated, as in vacuo, and the amine product isolated, usually as the crystalline hydrohalide salt corresponding to the halogen in the starting haloalkyl compound. In some cases the hydrohalide salt, e.g., the hydrochloride, crystallizes as the hydrate. In cases where a crystalline salt is difficult or impossible to obtain, the free basic amine itself may be distilled and crystallized from a solvent or solvent mixture or alternatively isolated as an oil by fractional distillation. Extraction of the reaction product with a suitable solvent, e.g., ether, benzene, toluene, or ethyl acetate, frequently assists in recovering all of the available product for isolation by crystallization and aqueous acid, e.g., two normal HCl, or anhydrous ketones, e.g., methyl ethyl ketone, are frequently of value as the solvent or medium from which crystallization or recrystallization is effected. Where the free base is desired, this may be obtained conventionally by neutralizing the reaction product or a solution of the isolated salt with a base such as ammonia, ammonium hydroxide, sodium carbonate, or other suitable alkaline material, extracting the liberated base with a suitable solvent such as ethyl acetate or benzene, drying the extract and evaporating to dryness in vacuo or fractionally distilling, or in other conventional manner. Numerous acid addition salts may be prepared from the free bases, either isolated or without isolation from the reaction product. Reference should be made to the appropriate examples for further particulars and details.

According to the hydrolysis procedure, a compound of Formula I is produced by hydrolysis of a compound of Formula XX, which has a saturated piperidine or pyrrolidine ring and a hydroxy substituent in the 3 or 4 position thereof, namely, in the same position as the phenyl or substituted phenyl substituent, with an acid, including the use of a compound which is capable of forming an acid in situ in the reaction mixture in question. It is advantageous to use a strong mineral or organic acid such as a hydrogen halide, e.g., hydrochloric acid, or sulfuric acid, either concentrated or dilute, or in admixture with acetic acid, or sulfonic, benezenesulfonic, p-toluene sulfonic acid, or trichloroacetic acid, or a compound which is capable of forming a strong acid in the reaction mixture, the dehydration thereby proceeding especially readily and smoothly. As an example, of such latter type compounds may be mentioned inorganic acid halides such as thionyl chloride, sulfuryl chloride, and phosphoric acid halides, such as phosphorus oxychloride and phosphorus trichloride, organic acid halides such as acetyl chloride and benzoyl chloride, and acid anhydrides such as sulfur trioxide, and the like.

In addition, weaker acids or compounds which are capable of forming weaker acids in the reaction mixture may sometimes be used to effect the dehydration. As examples may be mentioned phosphoric acids, especially dilute phosphoric acid, dichloroacetic acid, monochloroacetic acid, oxalic acid, succinic acid, citric acid, boric acid, boric acid triacetate, and the like.

The said dehydration may in many cases be effected even with very small amounts of the said acids or acid-forming compounds and, according to a specially convenient modification of the procedure, such an acid or compound is used in the dehydration step in an amount substantially smaller than that equivalent to the saturated hydroxy-substituted starting material. In this manner, the formation of byproducts which might otherwise result from the dehydration is avoided or limited.

Further, it has been found that the dehydration proceeds especially readily and smoothly when carried out in the presence of an agent capable of binding the water liberated by the reaction, such as acetic acid anhydride or the like.

Likewise, it is sometimes advantageous to undertake the dehydration step in the presence of a solvent. Examples of suitable solvents are hydrocarbons, especially aromatic hydrocarbons such as benzene, toluene, or xylene, halogenated hydrocarbons such as chloroform, alkanols such as methanol and ethanol, ethers, acetic acid, and the like.

The dehydration in many cases proceeds smoothly even at room temperature and, especially in cases where the dehydration is effected by a strong acid or a compound capable of forming such strong acid in the reaction mixture in question, in an amount approximately equivalent to the amount of saturated hydroxy-substituted starting material or in excess, it is advantageous in some cases to carry out the dehydration while cooling in order to limit the formation of byproducts.

In order to secure a reasonable time of reaction, it may be convenient in other cases to omit cooling of the reaction mixture or even to undertake the dehydration at an increased temperature, e.g., in the vicinity of the boiling point of a solvent chosen for the dehydration step, e.g., up to about 120° C. However, no substantial amounts of byproducts are or need be formed even at such increased temperatures, it only being necessary that the acid or acid-providing compound be used in case of higher temperatures in an amount substantially less than that equivalent to the starting saturated hydroxy compound.

*Chain extension.*—In the event it is desired that the carbon chain at the 5 position of the oxazolidinone nucleus be greater than two carbon atoms, this is conveniently accomplished by starting with the appropriate two carbon atom side-chain omega-haloalkyl compound and preparing the omega-nitrile. This nitrile may then be converted to the acid, which in turn may be converted to the acid halide, or converted to an ester. Either the acid halide, e.g., chloride, or the ester may be converted to the corresponding omega-hydroxyalkyl compound by reduction, the ester with sodium and alcohol, or the acid halide with sodium borohydride, in accord with conventional procedure. The 5-(omega-hydroxyalkyl) compound is then reacted with a suitable halogenating agent, e.g., thionyl chloride, phosphorus trichloride, or the corresponding bromo reagents, to replace the hydroxy group by a halogen atom and produce the corresponding omega-haloalkyl compound. This in turn may be reacted with an alkali metal cyanide to again produce the nitrile, in each case having a side-chain containing one carbon atom more than the starting 5-(omega-haloalkyl)-2-oxazolidinone with which the reaction sequence originates, if desired. Alternatively, the tosylate may be produced from the omega-hydroxyalkyl compound and para-toluene sulfonyl chloride. Either the omega-haloalkyl or the omega-tosylate compound may be reacted with the selected secondary cyclic amine to give the desired amine compound having a propyl side chain.

The 5-(omega-cyanoalkyl)-2-oxazolidinones are prepared in conventional manner by reaction of the selected 5-haloalkyl-2-oxazolidinone with an alkali metal cyanide, e.g., sodium cyanide, usually by heating the reactants together in a suitable organic solvent, preferably dimethylformamide. This procedure can be applied equally well to the 5-(beta-haloalkyl) compounds and the 5-(gamma-haloalkyl) compounds, in each case to introduce the cyano group in place of the halogen atom, and thus to extend the 5-alkyl carbon chain.

The 5-(omega-carboxyalkyl)-2-oxazolidinones are prepared by conventional acid hydrolysis of the corresponding 5-(omega-cyanoalkyl)-2-oxazolidinones, employing a concentrated mineral acid reagent. A reaction period of 24 hours and a temperature not in excess of 100 degrees is usually adequate.

The 5 - (omega-carbalkoxyalkyl)-2-oxazolidinones are prepared from the 5-(omega-carboxyalkyl)-2-oxazolidinones by standard esterification procedure involving the acid and the selected alcohol in the presence of a suitable esterification catalyst, e.g., hydrogen chloride, sulphuric acid, cation exchange resins, or an aromatic sulphonic acid such as benzene or p-toluene sulfonic acid, preferably with removal of either the ester product or water of reaction if optimum yields are desired. Alternatively, the acid may be reacted with a diazoalkane, e.g., diazomethane, in excellent yield, or an alkyl halide may be reacted with an alkali metal salt of the acid, in usual manner. Moreover, the acid may first be converted to an acid halide as by treatment with thionyl chloride or bromide, or phosphorus trichloride or tribromide, in the accepted manner for such type reactions, and the acid chloride then reacted with a selected alkanol or phenol or alkali metal salt thereof to give high yields of the desired ester.

The following preparations and examples are given by way of illustration only and are not to be construed as limiting:

PREPARATION I 5-(2-chloroethyl)-3-methyl-2-oxazolidinone AHR–1056

To 198 grams (2 moles) of phosgene, dissolved in 800 ml. of cold chloroform contained in a three liter, three-necked, round-bottomed flask equipped with a mechanical stirrer, dropping funnel, pot thermometer and condenser was added 204 grams (2 moles) of 1-methyl-3-pyrrolidinol in 450 ml. of chloroform. The reaction mixture was cooled in an ice bath and the addition was at such a rate that the pot temperature was kept below 10° C. After the addition of pyrrolidinol was completed, stirring was continued in the cold for 0.75 hour. Then, with continued cooling and stirring, 270 ml. (2 mole) of triethylamine was added and the reaction mixture allowed to warm to room temperature. The chloroform solution was extracted with dilute HCl, then dilute NaOH and finally water. The chloroform layer was dried over sodium sulfate. The chloroform was removed at reduced pressure on a rotary evaporator. Weight of the neutral residual oil was 238 grams. This product was distilled in vacuo (0.3 to 0.6 mm.). (During the distillation there was evidence of some decomposition.) After a small forerun, 200 grams (60% yield) of distillate (B.P. 120–135° C.) which contained a small amount of crystalline solid was collected, which was redistilled using a 6-inch heated column. The product (I) boiled at 120° C. at 0.2 mm., wt. 169 grams (52% yield).

*Analysis.*—Calc. for $C_6H_{10}NO_2Cl$ (percent): C, 44.04; H, 6.16; N, 8.56. Found (percent): C, 44.59; H, 6.31; N, 8.41.

Preparations II through VII are carried out in the same manner as Preparation I. The corresponding 2-bromoethyl compounds are prepared using carbonyl dibromide. Table I indicates the structure and other pertinent information for these preparations.

TABLE I

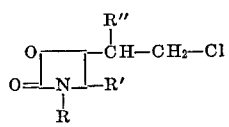

| Preparation No. | AHR No. | R | R' | R" | M.P., °C. | B.P., °C. | Pressure, mm. | Calculated for— C | H | N | Found C | H | N |
| --- | --- | --- | --- | --- | --- | --- | --- | --- | --- | --- | --- | --- | --- |
| II | 1045 | —$C_2H_5$ | H | H |  | 120–122 | 0.2 | 47.33 | 6.81 | 7.88 | 47.31 | 6.92 | 7.73 |
| III | 1205 | —n-$C_4H_9$ | H | H |  | 134–141 | 0.2 |  |  | 6.81 |  |  | 6.82 |
| IV | 1158 | cyclohexyl | H | H | 56–59 |  |  | 57.01 | 7.83 | 6.04 | 57.18 | 7.84 | 6.16 |
| V | 1060 | benzyl | H | H | 51–52 |  |  | 60.12 | 5.89 | 5.84 | 60.11 | 5.76 | 5.87 |
| VI | 1206 | —$CH_3$ | —$CH_3$ | H |  | 125–130 | 1.5 |  |  | 7.89 |  |  | 7.94 |
| VII | 1207 | —$CH_3$ | H | —$CH_3$ |  | 112–122 | 0.1 |  |  | 7.89 |  |  | 7.87 |

PREPARATION VIII 3-benzyl-5-(2-iodoethyl)-2-oxazolidinone AHR–1208

A solution of 12.0 grams (0.05 mole) of 3-benzyl-5-(2-chloroethyl)-2-oxazolidinone (Preparation V) and 10.5 grams (0.07 mole) of sodium iodide in 100 ml. of acetone was heated at gentle reflux with mechanical stirring for 20 hours. The reaction mixture was cooled and a white precipitate was separated by filtration and washed with acetone. The precipitate weighed 2.8 grams (95.5% of theoretical yield of sodium chloride). The combined filtrate and acetone wash were concentrated on a rotary evaporator. A brown oil remained, weight 16.8 grams. The oil was repeatedly extracted with hot isopropyl ether leaving a dark insoluble residue. The isopropyl ether solution deposited on cooling a slightly colored solid which on recrystallization from isopropyl ether yielded 5.0 grams of a white crystalline solid, M.P. 42–43° C. Also, 3.5 grams of a slightly discolored solid was recovered, M.P. 42–43° C. Yield 51.5%.

*Analysis.*—Calc. for $C_{12}H_{14}NO_2I$ (percent): N, 4.23. Found (percent): N, 4.44.

In the same manner, the corresponding bromo compound is prepared, using sodium bromide instead of sodium iodide.

PREPARATION IX 3-benzyl-5-(2-chloroethyl)-4,4-dimethyl-2-oxazolidinone 1-benzyl-2,2-dimethyl-3-pyrrolidinol [prepared according to the method of Ryan et al., J. Org. Chem. 27, 2901–5 (1962) but using benzylamine rather than methylamine] is reacted with phosgene as described in Preparation I to produce the above-identified compound.

PREPARATION X

Other chloroethyl compounds prepared by the same method as above are disclosed below and the pyrrolidinols from which they are derived are indicated. These pyrrolidinols are also prepared by the method of Ryan et al.

3-benzyl-5-(1-chloro-2-propyl)-2-oxazolidinone is produced from 1-benzyl-4-methyl-3-pyrrolidinol and phosgene.

3-benzyl-5-(2-chloroethyl)-4-methyl-2-oxazolidinone is produced from 1-benzyl-2-methyl-3-pyrrolidinol and phosgene.

3-benzyl-5-(2-chloropropyl)-2-oxazolidinone is produced from 1-benzyl-2-methyl-4-pyrrolidinol and phosgene.

Where the foregoing preparations produce a compound having a methyl or other lower-alkyl group, it is to be understood that compounds containing other lower-alkyl groups of straight or branched nature and containing up to eight carbon atoms inclusive, such as methyl, ethyl, propyl, isopropyl, butyl, sec.-butyl, t.-butyl, amyl, isoamyl, hexyl, heptyl, and octyl, are prepared in the same manner by substitution in the process of the appropriate different lower-alkyl starting material. Likewise, where chloro or other halogen atom is present, although chlorine is preferred, further halogen compounds including iodo, bromo, chloro, and fluoro compounds are preferred starting from the appropriate halogenated starting material. Substituted phenyl may be present in place of phenyl. Similarly, other molecular changes are readily made.

PREPARATION XI 5-(2-cyanoethyl)-3-methyl-2-oxazolidinone AHR–1214

A mixture of 8.2 grams (0.05 mole) of 5-(2-chloroethyl)-3-methyl-2-oxazolidinone and 3.8 grams (0.075 mole) of sodium cyanide in 50 ml. of dimethyl sulfoxide was heated on a steam bath overnight. The reaction mixture was filtered to remove the insoluble, inorganic salts and most of the dimethyl sulfoxide was distilled at reduced pressure. The residue was dissolved in approximately 60 ml. of water and the solution was extracted with chloroform. The chloroform solution was dried with sodium sulfate and the solvent removed on a rotary evaporator. The weight of the residual oil was 7.6 grams (99% yield). This oil was distilled in vacuo and 4.2 grams of slightly yellow oil, B.P. 165–175° C. at 0.2–0.4 m. was collected. The oil crystallized on standing for several days exposed to air and was recrystallized from a mixture of isopropyl alcohol and isopropyl ether. Yield: 2.8 grams (36.5%); M.P. 44–45° C.

*Analysis.*—Calc. for $C_7H_{10}N_2O_2$ (percent): N, 18.18. Found (percent): N, 18.13.

PREPARATION XII 3-benzyl-5-(2-cyanoethyl)-2-oxazolidinone 3-benzyl-5-(2 - chloroethyl)-2-oxazolidinone is reacted with sodium cyanide in the same manner as described for the prepration of AHR–1214 (Preparation XI) to produce the above-identified compound.

PREPARATION XIII 3-benzyl-2-oxazolidinone-5-propionic acid and alkyl esters thereof A mixture of 3-benzyl - 5 - (2-cyanoethyl)-2-oxazolidinone and a large excess of 70% sulfuric acid is stirred and heated at 80–90° C. for 24 hours and poured into ice and water. The precipate is separated and crystallized from an appropriate solvent and found to be the desired compound.

PREPARATION XIV 3-benzyl-2-oxazolidinone-5-propionyl chloride

A suspension of 3-benzyl-2-oxazolidinone-5-propionic acid in benzene is treated dropwise with approximately 2 molar equivalents of thionyl chloride with stirring. The resulting solution is heated for 1 hour at reflux and concentrated in vacuo. The residue is purified by crystallization from a nonpolar solvent or otherwise worked up to yield the desired compound.

PREPARATION XV 3-benzyl-5-(3-hydroxypropyl)-2-oxazolidinone

To a suspension of sodium borohydride in dry dioxane is rapidly added with stirring a solution of 3-benzyl-2-oxazolidinone-5-propionyl chloride or bromide in dry dioxane. The resulting mixture is stirred at reflux for 4 hours, cooled to room temperature and water is carefully added. The mixture is then partitioned between water and chloroform. The chloroform solution is dried with anhydrous sodium sulfate and concentrated in vacuo. The residue may be purified by crystallizing from an appropriate solvent to yield the above-identified compound.

PREPARATION XVI 3-benzyl-5-(3-chloropropyl)-2-oxazolidinone

A solution of 2 parts of thionyl chloride in chloroform is added dropwise to a solution of 1 part of 3-benzyl-5-(3-hydroxypropyl)-2-oxazolidinone and two parts of pyridine in chloroform with stirring and ice bath cooling. When the addition is complete, the mixture is heated at reflux for 5 hours, and then cooled in an ice bath. Water is added with stirring and then dilute hydrochloric acid is added until the mixture is acid. The chloroform layer is separated, dried with anhydrous sodium sulfate and concentrated in vacuo. The residue is crystallized in isopropyl ether and used directly in the halogen replacement reaction.

PREPARATION XVII 3-benzyl-5-[2-(4-hydroxy-4-phenylpiperidino)-ethyl]-2-oxazolidinone A mixture of 35 g. (0.145 mole) of 3-benzyl-5-(2-chloroethyl)-2-oxazolidinone, 25 g. (0.141 mole) of 4-hydroxy-4-phenylpiperidine and 20 g. (0.145 mole) of potassium carbonate in 300 ml. of n-butanol was refluxed under a nitrogen atmosphere for 16 hours. After cooling the salts were filtered off and the filtrate was evaporated under pressure to an oil. Trituration with dry ether gave 38.6 g. (72.5%) crude product. Recrystallization from benzene-isooctane gave 36 g. of pure product melting at 108–110° C.

*Analysis.*—Calc. for $C_{23}H_{28}N_2O_3$ (percent): C, 72.60; H, 7.42; N, 7.36. Found (percent): C, 72.51; H, 7.34; N, 7.26.

PREPARATION XVIII

5-[2-(4-hydroxy-4-phenylpiperidino)-ethyl]-2-oxazolidinone

A suspension of 26 g. (0.0685 mole) of 3-benzyl-5-[2-(4-hydroxy-4-phenylpiperidino)ethyl]-2-oxazolidinone in 30 ml. of dry tetrahydrofuran (THF) was added slowly to a stirred solution of 3.3 g. (0.143 mole) of sodium in 200 ml. of liquid ammonia. A heavy precipitate formed during addition. Before addition was complete the characteristic blue color disappeared so an additional 1.5 g. of sodium was added to the mixture. After addition was complete, the mixture was stirred an additional 3 hours, whereafter the ammonia was allowed to evaporate slowly. The resulting solid was treated with 300 ml. of THF then slowly with 50 ml. of isopropanol followed by 300 ml. of salt water. The organic layer was separated and the water layer was extracted several times with additional THF. The combined organic extracts were evaporated to a solid which was taken up again in THF, dried over magnesium sulfate and concentrated. Addition of dry ether caused the product to precipitate, yield 13.5 g. (68%); M.P. 180–183° C. Recrystallization from benzene-absolute alcohol did not change the melting point.

*Analysis.*—Calc. for $C_{16}H_{22}N_2O_3$ (percent): C, 66.18; H, 7.64; N, 9.65. Found (percent): C, 66.29; H, 7.73; N, 9.54.

EXAMPLE 1

5-[2-(4-phenyl-3,4-dehydropiperidinyl)-ethyl]-2-oxazolidinone. (AHR–1531)

A mixture of 20 g. (0.133 mole) of 5-(2-chloroethyl)-2-oxazolidinone, 21.2 g. (0.133 mole) of 4-phenyl-1,2,3,6-tetrahydropyridine, and 27 g. of sodium bicarbonate in 150 ml. of 2-butanol was refluxed with stirring under a nitrogen atmosphere for 48 hours. The suspension was filtered hot to remove the salts and on cooling 19 g. of crude product slowly precipitated. Recrystallization from methanol, filtration, and evaporation of the filtrate gave a solid which was repeatedly recrystallized from benzene-isooctane. The pure product, (5-[2-(4-phenyl-3,4-dehydropiperidinyl)-ethyl]-2-oxazolidinone), 5.7 g. (16%), melted at 143–145° C. (141–143° C. from another run) and gave IR and NMR (nuclear magnetic resonance) spectra consistent with the proposed structure.

*Analysis.*—Calc. for $C_{16}H_{20}N_2O_2$ (percent): C, 70.56; H, 7.40; N, 10.29. Found (percent): C, 70.65; H, 7.36; N, 10.24.

EXAMPLE 2

3-methyl-5-[2-(4-phenyl-3,4-dehydropiperidinyl)-ethyl]-2-oxazolidinone. (AHR–1680)

A stirred mixture of 8.35 g. (0.05 mole) of 3-methyl-5-(2-chloroethyl)-2-oxazolidinone, 10 g. (0.05 mole) of 4-phenyl-1,2,3,6-tetrahydropyridine hydrochloride, and 20 g. of sodium bicarbonate in 75 ml. of 2-butanol was refluxed under nitrogen for 24 hours. The mixture was cooled and the precipitate was removed by filtration. The solid precipitate was added to water and the insoluble product (8.9 g.) was filtered off and washed with water. The original filtrate was evaporated to an oil which was dissolved in benzene and dried over magnesium sulfate. The hot benzene solution was treated with isooctane and after cooling yielded 2.9 g. of additional product. Total yield 11.8 g. (82%); M.P. 101–103° C. The combined product was recrystallized from alcohol-water and gave 10.7 g. of product which melted at 102–104° C.

*Analysis.*—Calc. for $C_{17}H_{22}N_2O_2$ (percent): C, 71.30; H, 7.74; N, 9.78. Found (percent): C, 71.29; H, 7.72; N, 9.71.

EXAMPLE 3

3,4-dimethyl-5-[2-(4-phenyl-3,4-dehydropiperidinyl)-ethyl]-2-oxazolidinone. (AHR–1733 and 1734)

A stirred mixture of 9.75 g. (0.05 mole) of 4-phenyl-1,2,3,6-tetrahydropyridine hydrochloride, 8.85 g. (0.05 mole) of 3,4-dimethyl-5-(2-chloroethyl)-2-oxazolidinone, and 20 g. of sodium bicarbonate in 75 ml. of 2-butanol was allowed to reflux for 24 hours. The mixture was filtered and the filtrate was evaporated under reduced pressure to a solid. Recrystallization from isopropyl ether gave as a first crop 2.5 g. of product enriched in one isomer (M.P. 108–111° C.). The enriched product was triturated with hot ether to help remove more of the more soluble isomer, then recrystallized again from isopropyl ether, M.P. 112–114° C.; 1 g. An NMR spectrum indicated that the product was approximately 90% one isomer. This isomer (Isomer A) was labeled AHR–1734.

The filtrate from the first crop was concentrated and yielded 9.0 g. of a nearly 50:50 mixture of cis-trans isomers, M.P. 93–103° C. The mixture (of Isomer A and Isomer B) was labeled AHR–1733. The total yield of product was 11.5 g. (77%).

*Analysis.*—Calc. for $C_{18}H_{24}N_2O_2$ (percent): C, 71.97; H, 8.05; N, 9.32. Found (percent): C, 71.71; H, 8.22; N, 9.38.

EXAMPLE 4

5-[2-(3-phenyl-3,4-dehydropyrrolidinyl)-ethyl]-2-oxazolidinone. (AHR–1707) and the 2,3-dehydro analog A stirred mixture of 7.35 g. (0.05 mole) of 5-(2-chloroethyl)-2-oxazolidinone, 8 g. (0.05 mole) of 3-phenyl-3-pyrrolidinol, and 14 g. of sodium bicarbonate in 50 ml. of 2-butanol was allowed to reflux for 18 hours. The mixture was cooled, filtered, and the filtrate evaporated under reduced pressure to an oil (14 g.). The crude oil was dissolved in 50 ml. of 6 N HCl and heated on a steam bath for thirty minutes. (The dehydration was followed by thin-layer chromatography.) The acidic solution was cooled in ice, diluted wtih 100 ml. of ice-water, and treated slowly with cold 25% NaOH until basic. The resulting gum was extracted into chloroform which was dried over magnesium sulfate and then evaporated under reduced pressure to an oil (13 g.). The oil was dissolved in a small amount of benzene and chromatographed on 300 g. of 60–100 mesh Florisil (hydrated aluminosilicate adsorbent). The column was eluted with benzene containing increasing amounts of acetone up to pure acetone. The fractions containing the desired 3,4-dehydro product were combined and concentrated to an oil which was still slightly impure (7 g.). The oil crystallized from ethyl acetate and was recrystallized several times; yield 2.5 g. (20%, based on starting 4-phenyl-4-pyrrolidinol); M.P. 105–107° C. The analytical sample melted at 106–108° C.; UV—$\lambda_{max}$ 251 m$\mu$ ($\epsilon_{max}$ 12,654).

*Analysis.*—Calc. for $C_{15}H_{18}N_2O_2$ (percent): C, 69.74; H, 7.02; N, 10.84. Found (percent): C, 69.59; H, 7.13; N, 10.89.

A further fraction contained the desired 5-[2-(3-phenyl-2,3-dehydropyrrolidinyl)-ethyl]-2-oxazolidinone.

Additional compounds (prepared in the manner of Preparation XVII) from the appropriate selected starting materials include:

3-methyl-5-{2-[4-hydroxy-4-(2-methylthiophenyl)-piperidinyl]-ethyl}-2-oxazolidinone
3-methyl-5-{2-[4-hydroxy-4-(3-diethylaminophenyl)-piperidinyl]-ethyl}-2-oxazolidinone
3-methyl-5-{2-[4-hydroxy-4-(3-nitrophenyl)-piperidinyl]-ethyl}-2-oxazolidinone
3-ethyl-5-{2-[4-hydroxy-4-(2-methylthiophenyl)-piperidinyl]-ethyl}-2-oxazolidinone
3-ethyl-5-{2-[4-hydroxy-4-(3-diethylaminophenyl)-piperidinyl]-ethyl}-2-oxazolidinone From all of these compounds the corresponding substituted phenyl-3,4-dehydropiperidinyl compounds are produced by dehydration in accord with Example 4.

EXAMPLE 5

5-{2-[4-(4-fluorophenyl)-3,4-dehydropiperidinyl]-ethyl}-2-oxazolidinone. (AHR–1703)

A stirred mixture of 4.87 g. (0.032 mole) of 5-(2-chloroethyl)-2-oxazolidinone, 6.9 g. (0.032 mole) of 4-(4-fluorophenyl)-1,2,3,6-tetrahydropyridine hydrochloride, and 15 g. of sodium bicarbonate in 60 ml. of 2-butanol was allowed to reflux for 24 hours. The sodium salts were filtered off from the hot solution and, after cooling, the filtrate yielded 1.5 g. of product. The filtrate was evaporated to dryness and the residue was dissolved in chloroform and extracted several times with water. The chloroform layer was dried over magnesium sulfate and evaporated to a solid which after recrystallization from benzene melted at 138–140° C.; yield 4 g. The total yield was 5.5 g. (59%). The analytical sample melted at 140–142° C.

*Analysis.*—Calc. for $C_{16}H_{19}FN_2O_2$ (percent): C, 66.19; H, 6.60; N, 9.65. Found (percent): C, 65.97; H, 6.42; N, 9.62.

EXAMPLE 6

3-methyl-5-{2-[4-(4-fluorophenyl)-3,4-dehydropiperidinyl]-ethyl}-2-oxazolidinone. (AHR–1704)

A stirred mixture of 6.1 g. (0.037 mole) of 3-methyl-5-(2-chloroethyl)-2-oxazolidinone, 8 g. (0.037 mole) of 4-(4-fluorophenyl)-1,2,3,6-tetrahydropyridine hydrochloride, and 18 g. of sodium bicarbonate in 65 ml. of 2-butanol was allowed to reflux under a nitrogen atmosphere for 24 hours. The mixture was filtered while still hot and the filtrate was concentrated to an oil. The oil was dissolved in benzene and the solution was dried over magnesium sulfate. The benzene solution was heated and treated with isooctane. After cooling, 8.8 g. of nearly pure product was collected. The product was charcoaled and recrystallized from benzene-isooctane, yield 7.2 g. (63%); M.P. 98–100° C. A second crop (0.6 g.) melted at 94–96° C.

*Analysis.*—Calc. for $C_{17}H_{21}FN_2O_2$ (percent): C, 67.08; H, 6.96; N, 9.20. Found (percent): C, 66.97; H, 6.88; N, 9.14.

EXAMPLE 7

3,4 - dimethyl - 5 - {2-[4-(4-fluorophenyl)-3,4-dehydropiperidinyl] - ethyl} - 2 - oxazolidinone hydrochloride. (AHR–1705 and 1706)

A stirred mixture of 8.35 g. (0.047 mole) of 3,4-dimethyl-5-(2-chloroethyl)-2-oxazolidinone, 10 g. of 4-(4- and 20 g. of sodium bicarbonate in 75 ml. of 2-butanol was allowed to reflux for 24 hours. The mixture was cooled, filtered and the filtrate was evaporated to an oil which solidified. The solid was boiled in ether and the undissolved product was filtered off (4.8 g.). The NMR spectrum indicated the solid was mostly one isomer. Attempts to purify the single isomer as a hydrochloride salt failed due to the formation of a gelatinous precipitate in the several solvents used. The pure isomer (Isomer A) was obtained, however, after several recrystallizations of the product from isopropyl ether; yield 1.5 g. (9%); M.P. 99–101° C. The analytical sample melted at 101–103° C. The single isomer (Isomer A) was labeled AHR–1706.

The original ether filtrate was treated with ethereal HCl and yielded a crystalline salt which melted at 192–196° C. after recrystallization from ethyl acetate-methanol, yield 7.2 g. (43%). This product was a mixture of Isomer A and Isomer B. The NMR spectrum indicated the isomer composition of the salt was approximately 60% of one isomer and 40% of the other. The isomeric mixture was labeled AHR–1705.

Analysis.—Calc. for $C_{18}H_{24}ClFN_2O_2$ (salt) (percent): C, 60.92; H, 6.82; N, 7.90. Found (percent): C, 60.97; H, 6.79; N, 7.88.

Analysis.—Calc. for $C_{18}H_{23}FN_2O_2$ (free base) (percent): C, 67.90; H, 7.28; N, 8.80. Found (percent): C, 67.89; H, 7.33; N, 8.74.

EXAMPLE 8

5-[2-(4-p-tolyl-6-methyl-3,4-dehydropiperidinyl)ethyl]-2-oxazolidinone

In the same manner as given in Example 1, this compound is prepared by the reaction of 5-(2-bromoethyl)-2-oxazolidinone and 4-(p-tolyl)-6-methyl-1,2,5,6-tetrahydropyridine or its hydrochloride.

EXAMPLE 9

5-[2-(4-trifluoromethylphenyl-3,4-dehydropiperidinyl)propyl]-2-oxazolidinone

In the same manner as given in Example 1, this compound is prepared by the reaction of 5-(2-chloropropyl)-2-oxazolidinone and 4-(p-trifluoromethylphenyl)-1,2,3,6-tetrahydropyridine or its hydrochloride.

EXAMPLE 10

5-[2-(4-m-dimethylaminophenyl-3,4-dehydropiperidinyl)ethyl]-2-oxazolidinone

In the same manner as given in Example 1, this compound is prepared by the reaction of 5-(2-chloroethyl)-2-oxazolidinone and 4-(m-dimethylaminophenyl)-1,2,3,6-tetrahydropyridine or its hydrochloride.

EXAMPLE 11

5-[2-(4-p-methylmercaptophenyl-3,4-dehydropiperidinyl)ethyl]-2-oxazolidinone

In the same manner as given in Example 1, this compound is prepared by the reaction of 5-(2-chloroethyl)-2-oxazolidinone and 4-(p-methylmercaptophenyl)-1,2,3,6-tetrahydropyridine or its hydrochloride.

EXAMPLE 12

5-[1-(4-p-methoxyphenyl-3,4-dehydropiperidinyl)-2-propyl]-2-oxazolidinone

In the same manner as given in Example 1, this compound is prepared by the reaction of 5-(1-chloro-2-propyl)-2-oxazolidinone and 4-(p-methoxyphenyl)-1,2,3,6-tetrahydropyridine or its hydrochloride.

EXAMPLE 13

5-[2-(4-p-nitrophenyl-3,4-dehydropiperidinyl)ethyl]-2-oxazolidinone

In the same manner as given in Example 1, this compound is prepared by the reaction of 5-(2-chloroethyl)-2-oxazolidinone and 4-(p-nitrophenyl)-1,2,3,6-tetrahydropyridine or its hydrochloride.

EXAMPLE 14

3-cyclohexyl-5-[2-(4-phenyl-3,4-dehydropiperidinyl)ethyl]-2-oxazolidinone

In the same manner as given in Example 2, this compound is prepared by the reaction of 3-cyclohexyl-5-(2-chloroethyl)-2-oxazolidinone and 4-phenyl-1,2,3,6-tetrahydropyridine or its hydrochloride.

EXAMPLE 15

3-benzyl-5-[2-(4-phenyl-3,4-dehydropiperidinyl)ethyl]-2-oxazolidinone

In the same manner as given in Example 2, this compound is prepared by the reaction of 3-benzyl-5-(2-chloroethyl)-2-oxazolidinone and 4-phenyl-1,2,3,6-tetrahydropyridine or its hydrochloride.

EXAMPLE 16

3-(p-tolylmethyl)-5-[2-(4-phenyl-3,4-dehydropiperidinyl)ethyl]-2-oxazolidinone

In the same manner as given in Example 2, this compound is prepared by the reaction of 3-(p-tolylmethyl)-5-(2-chloroethyl)-2-oxazolidinone and 4-phenyl-1,2,3,6-tetrahydropyridine or its hydrochloride.

EXAMPLE 17

3-(p-methoxybenzyl)-5-[2-(4-phenyl-3,4-dehydropiperidinyl)ethyl]-2-oxazolidinone In the same manner as given in Example 2, this compound is prepared by the reaction of 3-(p-methoxybenzyl)-5-(2-chloroethyl)-2-oxazolidinone and 4-phenyl-1,2,3,6-tetrahydropyridine or its hydrochloride.

EXAMPLE 18

3-(p-trifluoromethylbenzyl)-5-[2-(4-phenyl-3,4-dehydropiperidinyl)ethyl-2-oxazolidinone In the same manner as given in Example 2, this compound is prepared by the reaction of 3-(p-trifluoromethylbenzyl)-5-(2-chloroethyl)-2-oxazolidinone and 4-phenyl-1,2,3,6-tetrahydropyridine or its hydrochloride.

EXAMPLE 19

4-methyl-5-[2-(2-methyl-3-phenyl-2,3- and 3,4-dehydropyrrolidinyl)propyl]-2-oxazolidinone In the same manner as given in Example 4, this compound is prepared by reaction of 4-methyl-5-(2-chloropropyl)-2-oxazolidinone and 2-methyl-3-phenyl-3-pyrrolidinol and dehydration of the resulting hydroxy ring compound to the corresponding 3,4-dehydro compound. A small amount of the 2,3-dehydro compound is also obtained. Both compounds exist in the form of optical isomers as mixtures thereof.

EXAMPLE 20

5-[1-(3-phenyl-5-methyl-2,3- and 3,4-dehydropyrrolidinyl)-2-propyl]-2-oxazolidinone In the same manner as given in Example 4, this compound is prepared by reaction of 5-(1-chloro-2-propyl)-2-oxazolidinone and 3-phenyl-5-methyl-3-pyrrolidinol and dehydration of the resulting hydroxy ring compound to the corresponding 3,4-dehydro compound. A small amount of the 2,3-dehydro compound is also obtained. Both compounds exist in the form of optical isomers as well as mixtures thereof.

EXAMPLE 21

5-[2-(2,2-dimethyl-3-p-tolyl-3,4-dehydropyrrolidinyl)ethyl]-2-oxazolidinone

In the same manner as given in Example 4, this compound is prepared by reaction of 5-(2-chloroethyl)-2-oxazolidinone and 2,2-dimethyl-3-(p-tolyl)-3-pyrrolidinol and dehydration of the resulting hydroxy ring compound to the corresponding 3,4-dehydro compound.

EXAMPLE 22

5-[2-(3-p-trifluoromethylphenyl-2,2,5,5-tetramethyl-3,4-dehydropyrrolidinyl)-ethyl]-2-oxazolidinone In the same manner as given in Example 4, this compound is prepared by reaction of 5-(2-chloroethyl)-2- oxazolidinone and 3-(p-trifluoromethylphenyl)-2,2,5,5-tetramethyl-3-pyrrolidinol and dehydration of the resulting hydroxy ring compound to the corresponding 3,4-dehydro compound.

EXAMPLE 23

3-benzyl-5-[3-(3-p-hydroxyphenyl-3,4-dehydropyrrolidinyl)propyl]-2-oxazolidinone In the same manner as given in Example 4, this compound is prepared by reaction of 3-benzyl-5-(3-chloropropyl)-2-oxazolidinone (Preparation XVI) and 3-(p-hydroxyphenyl)-3-pyrrolidinol and dehydration of the resulting hydroxy ring compound to the corresponding 3,4-dehydro compound.

EXAMPLE 24

5-[2-(3-phenyl-2,3- and 3,4-dehydropiperidinyl)ethyl]-2-oxazolidinone

In the same manner as given in Example 4, these compounds are prepared by reaction of 5-(2-chloroethyl)-2-oxazolidinone and 3-phenyl-3-piperidinol and dehydration of the resulting hydroxy ring compound to a mixture of the two corresponding dehydro compounds.

EXAMPLE 25

5-[2-(4-phenyl-3,4-dehydropiperidinyl)-ethyl]-2-oxazolidinone (AHR-1531)

In the same manner as given in Example 4, this compound is prepared by dehydration of 5-[2-(4-hydroxy-4-phenylpiperidino) - ethyl]-2-oxazolidinone (Preparation XVIII).

EXAMPLE 26

3-benzyl-5-[2-(4-phenyl-3,4-dehydropiperidinyl)-ethyl]-2-oxazolidinone

In the same manner as given in Example 4, this compound is prepared by dehydration of 3-benzyl-5-[2-(4-hydroxy-4-phenyl-piperidino)-ethyl] - 2 - oxazolidinone. (Preparation XVII).

EXAMPLE 27

3-benzyl-5-[3-(4-phenyl-3,4-dehydropiperidinyl)-propyl]-2-oxazolidinone 3-benzyl-5-(3-chloropropyl) - 2 - oxazolidinone (Preparation XVI) is reacted with 4-phenyl-1,2,3,6-tetrahydropyridine or its hydrochloride in the same manner as given in Example 2 to produce the above-identified compound.

EXAMPLE 28

3-methyl-5-[2-(3-methyl-4-phenyl-3,4-dehydropiperidinyl)-ethyl]-2-oxazolidinone

In the same manner as given in Example 2, this compound is prepared by the reaction of 3-methyl-5-(2-chloroethyl)-2-oxazolidinone and 3-methyl-4-phenyl-1,2,5,6-tetrahydropyridine or the hydrochloride salt thereof.

EXAMPLE 29

3-methyl-5-[2-(5-methyl-4-phenyl-3,4-dehydropiperidinyl)-ethyl]-2-oxazolidinone

In the same manner as given in Example 2, this compound is prepared by the reaction of 3-methyl-5-(2-chloroethyl)-2-oxazolidinone and 5-methyl-4-phenyl-1,2,5,6-tetrahydropyridine or the hydrochloride salt thereof.

EXAMPLE 30

3-methyl-5-[2-(5-methyl-4-o-tolyl-3,4-dehydropiperidinyl)-ethyl]-2-oxazolidinone In the same manner as given in Example 2, this compound is prepared by the reaction of 3-methyl-5-(2-chloroethyl)-2-oxazolidinone and 5-methyl-4-o-tolyl-1,2,5,6-tetrahydropyridine or the hydrochloride salt thereof.

EXAMPLE 31

3-methyl-5-[2-(3-methyl-4-o-tolyl-3,4-dehydropiperidinyl)-ethyl]-2-oxazolidinone In the same manner as given in Example 2, this compound is prepared by the reaction of 3-methyl-5-(2-chloroethyl)-2-oxazolidinone and 3-methyl-4-o-tolyl-1,2,5,6-tetrahydropyridine or the hydrochloride salt thereof.

Still other compounds preparable in the same manner from the appropriate starting materials include:

3-methyl - 5 - [2 - (3 - methyl-4-phenyl-3,4-dehydropyrrolidinyl)-ethyl]-2-oxazolidinone and 3-methyl-5-[2-(3-methyl-4-o-tolyl - 3,4 - dehydropyrrolidinyl)-ethyl]-2-oxazolidinone.

Where any of the foregoing examples produce a compound having a methyl or other lower-alkyl group, it is to be understood that the compounds containing other lower-alkyl groups of straight or branched nature and containing up to eight carbon atoms inclusive, such as methyl, ethyl, propyl, isopropyl, butyl, sec.-butyl, t.-butyl, amyl, isoamyl, hexyl, heptyl, and octyl, are prepared in the same manner by substitution in the process of the appropriate different lower-alkyl starting material. Likewise, where chloro or other halogen atom is present, although chlorine is preferred, further halogen compounds including iodo, bromo, chloro, and fluoro compounds are prepared starting from the appropriate halogenated starting material. Similarly, where methoxy or other lower-alkoxy group is present, compounds having other lower-alkoxy groups containing various lower-alkyl groups having up to eight carbon atoms inclusive are prepared in the same manner from the appropriate different lower-alkoxy starting material. Moreover, when one di-lower-alkylamino group, such as the dimethylamino group, is present in a compound, other dilower-alkylamino compounds are prepared in the same manner starting only with the selected different dilower-alkylamino compound. In the same manner, ortho and meta products are produced instead of the para by utilizing the selected ortho or meta substituted starting material. Similarly, other molecular changes within the scope of the invention are readily made.

The compounds of the invention having the foregoing Formula I are generally characterized by important pharmacological activity, indicative of their use in counteracting certain physiological abnormalities in an animal body. The compounds of Formula I are major tranquilizers.

The activity of the pharmacologically active agents of the present invention, as evidenced by tests in lower animals, is indicative of utility based on their valuable activity in human beings as well as in lower animals. It will be clearly understood however, that the distribution and marketing of any compound or composition falling within the scope of the present invention for use in human beings will of course have to be predicated upon prior approval by governmental agencies, such as the U.S. Federal Food and Drug Administration, which are responsible for and authorized to pass judgment on such questions.

The compounds of the invention have a basic (amino) nitrogen atom in the molecule and are usually most conveniently employed in the form of non-toxic acid-addition salts. Such salts also have improved water-solubility. Although the non-toxic salts are preferred, any salt may be prepared for use as a chemical intermediate, as in the preparation of another but non-toxic acid-addition salt. The free basic compounds may be conveniently converted to their acid addition salts by reaction of the free base with the selected acid. The acids which can be used to prepare the preferred non-toxic acid addition salts are those which produce, when combined with the free bases, salts the anions of which are relatively innocuous to the animal organism in therapeutic doses of the salts, so that beneficial physiological properties inherent in the free bases are not vitiated by side-effects ascribable to the anions.

Appropriate acid-addition salts are those derived from mineral acids such as hydrochloric acid, hydrobromic acid, hydroiodic acid, nitric acid, sulfuric acid, and phosphoric acid; and organic acids such as acetic acid, citric acid, lactic acid, fumaric acid, maleic acid, and tartaric acid. The preferred acid addition salt is generally the hydrochloride, maleate, or fumarate.

The acid-addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely the free base may be obtained conventionally by neutralizing the acid-addition salt with an appropriate base such as ammonia, ammonium hydroxide, sodium carbonate or the like, extracting the liberated base with a suitable solvent, illustratively ethyl acetate or benzene, drying the extract and evaporating to dryness or fractionally distilling, or in other conventional manner.

When there are two or more basic nitrogen atoms present in the compounds of the invention, poly-acid-addition salts may be obtained by employing the proper increased molar ratios of ester or acid to the free base.

*Formulation and administration.*—Effective quantities of any of the foregoing pharmacologically active compounds of Formula I may be administered to a living animal body in any one of various ways, for example, orally as in capsules or tablets, parenterally in the form of sterile solutions or suspensions, and in some cases intravenously, e.g., in the form of sterile isotonic solutions. The compounds may be administered alone or in combination with other pharmacologically effective agents, such as analgesics, sedatives, antacids, other tranquilizing agents, antiappetite or antiulcer drugs, or the like, as well as buffers and usual pharmaceutical carriers or diluents. The free basic amino compounds, while effective, are preferably formulated and administered in the form of their non-toxic acid-addition salts for purposes of convenience of crystallization, increased solubility, and the like. The compounds of Formula I, especially in the form of their acid-addition salts, represent a preferred group of highly active compounds, of which the 4-phenyl-3,4-dehydropiperidinyl and 3-phenyl-3,4-dehydropyrrolidinyl compounds are outstandingly active. Preferred groups at the 3-position are hydrogen, methyl or ethyl.

Although very small quantities of the active materials of the present invention are effective when minor therapy is involved or in cases of administration to subjects having a relatively low body weight, unit dosages are usually five milligrams or above and preferably twenty-five, fifty or one-hundred milligrams or even higher, depending of course upon the emergency of the situation and the particular result desired. Five to fifty milligrams appears optimum per unit dose, while usual broader ranges appear to be one to 100 milligrams per unit dose. The active agents of the invention may be combined with other pharmacologically active agents, or with buffers, antacids or the like, for administration and the proportion of the active agent in the compositions may be varied widely. It is only necessary that the active ingredient constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to established medical principles under the direction of a physician or veterinarian. Results upon administration of these novel materials have thus far proved extremely gratifying.

The formulations of the following example are representative for all of the pharmacologically active compounds of the invention, but have been especially designed to embody as active ingredient a compound of Formula I wherein the 5 side chain is a 3- or 4-phenyldehydropiperidinylethyl or 3 - phenyldehydropyrrolidinylethyl side chain and the 3-R group is preferably hydrogen, methyl or ethyl, especially as the maleate, fumarate, hydrochloride, hydrobromide, or like pharmaceutically acceptable salt, and particularly the compounds of Examples 1 and 4 designated AHR–1531 and 1707 and physiologically acceptable acid addition salts thereof.

EXAMPLE FORMULATIONS (1) *Capsules.*—Capsules of 5 mg., 25 mg., and 50 mg. of active ingredient per capsule are prepared. With the higher amounts of active ingredient, reduction may be made in the amount of lactose.

| Typical blend for encapsulation | Per capsule, mg. |
|---|---|
| Active Ingredient, as salt | 5.0 |
| Lactose | 296.7 |
| Starch | 129.0 |
| Magnesium Stearate | 4.3 |
| Total | 435.0 |

Additional capsule formulations preferably contain a higher dosage of active ingredient and are as follows:

| Ingredients | 100 mg. per capsule | 250 mg. per capsule | 500 mg. per capsule |
|---|---|---|---|
| Active ingredient, as salt | 100.0 | 250.0 | 500.0 |
| Lactose | 231.5 | 126.5 | 31.1 |
| Starch | 99.2 | 54.2 | 13.4 |
| Magnesium stearate | 4.3 | 4.3 | 5.5 |
| Total, mg | 435.0 | 435.0 | 550.0 |

In each case, uniformly blend the selected active ingredient with lactose, starch, and magnesium stearate and encapsulate the blend.

(2) *Tablets.*—A typical formulation for a tablet containing 5.0 mg. of active ingredient per tablet follows. The formulation may be used for other strengths of active ingredient by adjustment of weight of dicalcium phosphate.

| | Per tablet, mg. |
|---|---|
| (1) Active ingredient | 5.0 |
| (2) Corn starch | 13.6 |
| (3) Corn starch (paste) | 3.4 |
| (4) Lactose | 79.2 |
| (5) Calcium phosphate | 68.0 |
| (6) Calcium stearate | 0.9 |
| Total | 170.1 |

Uniformly blend 1, 2, 4 and 5. Prepare 3 as a 10 percent paste in water. Granulate the blend with starch paste and pass the wet mass through an eight mesh screen. The wet granulation is dried and sized through a twelve mesh screen. The dried granules are blended with the calcium stearate and compressed.

Additional tablet formulations preferably contain a higher dosage of the active ingredient and are as follows:

(A) 50 MG. TABLET

| Ingredients: | Per tablet, mg. |
|---|---|
| Active ingredient, as salt | 50.0 |
| Lactose | 90.0 |
| Milo starch | 20.0 |
| Corn starch | 38.0 |
| Calcium stearate | 2.0 |
| Total | 200.0 |

Uniformly blend the active ingredient, lactose, milo starch and corn starch. This blend is granulated using water as a granulating medium. The wet granules are passed through an eight mesh screen and dried at 140 to 160 degrees Fahrenheit overnight. The dried granules are passed through a number ten mesh screen and blended with the proper amount of calcium stearate and this blend is then converted into tablets on a suitable tablet press.

(B) 100 MG. TABLET

| Ingredients: | Per tablet, mg. |
|---|---|
| Active ingredient, as salt | 100.0 |
| Lactose | 190.0 |
| Dicalcium phosphate | 172.2 |
| Starch | 54.0 |
| Milo starch | 21.6 |
| Calcium stearate | 2.2 |
| Total | 540.0 |

Uniformly blend the active ingredient, lactose, dicalcium phosphate, starch and milo starch. This blend is granulated with water and the wet mass is passed through a number eight mesh screen. The wet granules are dried at 140–160 degrees Fahrenheit overnight. The dried granules are passed through a number ten mesh screen. These dried granules are blended with the proper weight of calcium stearate and the lubricated granules are then converted into tablets on a suitable tablet press.

(C) 250 MG. TABLET

| Ingredients: | Per tablet, mg. |
|---|---|
| Active ingredient, as salt | 250.0 |
| Corn starch | 56.0 |
| Carbowax 6000 (polyethylene glycol of M.W. approximately 6000) | 25.0 |
| Lactose | 35.0 |
| Magnesium stearate | 4.0 |
| Total | 370.0 |

Uniformly blend the active ingredient, Carbowax 6000, lactose, and one-half the weight of magnesium stearate required. This blend is then "slugged" on a suitable tablet press. These "slugs" are granulated through a ten mesh screen on an oscillating granulator. These granules are then blended with the remainder of the magnesium stearate and the lubricated granules are then converted into tablets on a suitable tablet press.

(D) 500 MG. TABLET

| Ingredients: | Per tablet, mg. |
|---|---|
| Active ingredient, as salt | 500.0 |
| Corn starch (wet) | 86.4 |
| Milo starch | 32.4 |
| Calcium stearate | 3.2 |
| Corn starch (dry) | 26.0 |
| Total | 648.0 |

Uniformly blend the active ingredient, corn starch and milo starch. This blend is wet granulated using water and the wet mass is passed through a number eight mesh screen. These wet granules are dried overnight at 140–160 degrees Fahrenheit. The dried granules are passed through a number ten mesh screen. The dried granules and weighed amounts of corn starch and calcium stearate are uniformly blended and these lubricated granules are compressed on a suitable tablet press.

(3) *Injectable—2% sterile solution.—*

Per cc.
Active ingredient _____ 20 mg.
Preservative, e.g., chlorobutanol __ 0.5% weight/volume
Water for injection _____ q.s.

Prepare solution, clarify by filtration, fill into vials, seal, and autoclave.

(4) The pharmacologically active compounds provided by the present invention may also be administered successfully by embodying an effective quantity thereof in an injectable suspension for injection into an animal body, in oral powders, suspensions or syrups, and in other acceptable dosage forms.

PREPARATION 3-methyl-5-{2-[4 - (3 - trifluoromethylphenyl) - 4-hydroxy-piperidinyl]ethyl}-2-oxazolidinone. Hydrochloride A mixture of 19.5 g. (0.089 mole) of 3-methyl-5-(2-chloroethyl)-2-oxazolidinone, 25.0 g. (0.089 mole) of 4-(3-trifluoromethylphenyl)-4 - piperidinol hydrochloride and 50 g. of potassium carbonate in 200 ml. of 1-butanol was allowed to reflux under an atmosphere of nitrogen for 36 hours. The hot mixture was filtered and the filtrate was evaporated to an oil. The oil was dissolved in benzene and washed several times with water. The benzene solution was dried over magnesium sulfate and evaporated to an oil. The oily product was dissolved in ether and treated with ethereal HCl. After recrystallization the hydrochloride salt (27.1 g.; 75%) melted at 221–223° C.

EXAMPLE 32

3-methyl-5-{2-[4-(3 - trifluoromethylphenyl) - 3,4-dehydropiperidinyl]-ethyl}-2-oxazolidinone Hydrochloride. (AHR 1862)

A solution of 11.2 g. (0.0275 mole) of 3-methyl-5-{2-[4-(3-trifluoromethylphenyl) - 4 - hydroxypiperidinyl]ethyl}-2-oxazolidinone hydrochloride in 100 ml. concentrated $H_2SO_4$ was stirred for 30 minutes and then poured onto ice. The solution was carefully neutralized with 6 N NaOH in the cold and the product was extracted with chloroform. The chloroform extract was dried over magnesium sulfate and evaporated to an oil (8.2 g.). The impure oil was dissolved in benzene and chromatographed on 250 g. of 60–100 mesh Florisil using benzene containing increasing amounts of acetone for elution. The oily product (4.2 g.) obtained from the column was dissolved in isopropanol and treated with ethereal HCl. The resulting hydrochloride, 2.9 g. (28%), melted at 206–209° C. An analytical sample melted at 207–209° C. after one recrystallization from isopropanol.

*Analysis.*—Calc. for $C_{18}H_{22}ClF_3N_2O_2$ (percent): C, 55.31; H, 5.67; N, 7.17. Found (percent): C, 55.14; H, 5.79; N, 7.25.

PREPARATION 3-methyl-5-{2-[4-(4-methoxyphenyl)-4-hydroxy-piperidinyl]ethyl}-2-oxazolidinone

*Appearance.*—White powder.
*Analysis.*—Calc. for $C_{18}H_{26}N_2O_4$ (percent): C, 64.65; H, 7.84; N, 8.38. Found (percent): C, 64.74; H, 7.86; N, 8.31.
*Yield.*—59%. Melting point.—150–152° C.

This compound was prepared by the reaction of 3-methyl-5-(2-chloroethyl)-oxazolidinone with 4-(4-methoxyphenyl)-4-piperidinol using the general reaction method described in the preceding examples.

EXAMPLE 33

3-methyl-5-{2-[4-methoxyphenyl-3,4-dihydropiperidinyl]ethyl}-2-oxazolidinone (AHR–1877)

A 2.0 g. (0.006 mole) sample of 3-methyl-5-{2-[4-methoxyphenylpiperidinyl]ethyl}-2-oxazolidinone (AHR–1840) in 50 ml. of 6 N hydrochloric acid was heated at 95° C. on the steam bath for 3 hours. Alkalinization with ammonia water, followed by extraction into chloroform, produced 2.1 g. of extract which crystallized and which presented after thin layer chromatography (20% methanol-benzene, silica) a major reaction product, a small amount of starting material, and a small amount of a polar reaction product. Four recrystallizations from ethyl acetate gave pure 3-methyl-5-{2-[4-methoxyphenyl-3,4-dehydropiperidinyl]ethyl} - 2 - oxazolidinone compound, 320 mg., M.P. 118.5°–121° C. after drying at 85° C./0.1 mm.

Chromatography of mother liquor material on magnesium silicate produced 390 mg. of additional material. Total yield was 710 mg., 38% of theoretical.

*Analysis.*—Calc. for $C_{18}H_{24}N_2O_3$ (percent): C, 68.33; H, 7.65; N, 8.85. Found (percent): C, 68.32; H, 7.68; N, 8.90.

Since asymmetric carbon atoms are present in many of the compounds of the present invention, optical isomers exist in such cases. When two symmetric centers are present, pairs of diastereoisomers are possible. These diastereoisomers, together with optically active forms, are included within the scope of the present invention. The two pairs of diastereoisomers may be separated and resolution of the diastereoisomers into their optically active form may be accomplished by combining the basic diastereoisomers with an optically active organic acid and separating by fractional crystallization the *d-* and *l-*forms.

Representative compounds of the invention were tested using the method of Yen, et al., Arch. Int. Pharmacodn. 123, 179 (1959). The compounds were given initially at a dose level of 20 mg./kg., i.p. to groups containing five mice per group. Those compounds which were very active at the initial dose level of 20 mg./kg., i.p. were then administered at lower doses. Compounds which showed less activity at the initial dose level of 20 mg./kg. i.p. were generally not tested further, i.e., dose levels greater than 20 mg./kg., i.p. were not employed. Representative compounds tested and results obtained are as follows:

EXAMPLE 1 (AHR–1531)

5/5 protected at 20 mg./kg.
4/5 protected at 10 mg./kg.
1/5 protected at 5 mg./kg. ($ED_{50}$=7.1 mg./kg.)

EXAMPLE 2 (AHR–1680)

4/5 protected at 20 mg./kg.
3/5 protected at 15 mg./kg. ($ED_{50}$=13.2 mg./kg.)

EXAMPLE 3 (AHR–1733)

3/5 protected at 20 mg./kg.

EXAMPLE 4 (AHR–1707)

4/5 protected at 20 mg./kg.
2/5 protected at 10 mg./kg.

EXAMPLE 5 (AHR–1703)

2/5 protected at 20 mg./kg.

EXAMPLE 6 (AHR–1704)

2/5 protected at 20 mg./kg.

EXAMPLE 7 (AHR–1705)

4/5 protected at 20 mg./kg.
3/5 protected at 15 mg./kg.
1/5 protected at 10 mg./kg.

The effective dose in 50% of the animals ($ED_{50}$) was determined by probit analysis by the method of J. Litchfield and F. Wilcoxon, J. Pharm. and Exptl. Therap. 96, 99 (1949).

We claim:

1. A composition useful for its tranquilizing effect comprising an effective amount of about one to 100 milligrams of an active tranquilizing compound which is a 5-omega-substituted 2-oxazolidinone selected from the group consisting of (A) a compound of the formula:

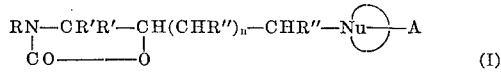

(I)

wherein *n* is selected from the group consisting of 1 and 2, wherein R is selected from the group consisting of hydrogen, lower-alkyl, cycloalkyl having up to eight carbon atoms in the ring, phenyllower-alkyl, and substituted phenyllower-alkyl wherein the substituents are selected from the group consisting of halo, lower-alkyl, lower-alkoxy, trifluoromethyl, lower-alkyl-mercapto, di-lower-alkylamino, nitro, and hydroxy, a maximum of 15 carbon atoms being present in any R radical, wherein R' is selected from the group consisting of hydrogen and methyl, wherein R" is selected from the group consisting of hydrogen and methyl, wherein

is a heterocyclic ring selected from the group consisting of 2,3-dehydropyrrolidinyl, 3,4-dihydropyrrolidinyl, 2,3-dehydropiperidinyl, and 3,4-dehydropiperidinyl, wherein A is phenyl or substituted phenyl attached to a carbon atom of the ring double bond and in the 3 or 4 position of the heterocyclic ring, remaining valences of the carbon atoms of the heterocyclic ring being satisfied by hydrogen and zero through four methyl groups, wherein phenyl substituents are selected from the group consisting of halo, lower-alkyl, lower-alkoxy, trifluoromethyl, lower-alkylmercapto, di-lower-alkylamino, nitro, and hydroxy, and (B) acid addition salts thereof, together with a pharmaceutically acceptable carrier.

2. A composition of claim 1 useful for its tranquilizing effect comprising an effective dose of at least about one milligram of 5-[2-(4-phenyl-3,4-dihydropiperidinyl)-ethyl]-2-oxazolidinone together with a pharmaceutically acceptable carrier.

3. A composition of claim 1 useful for its tranquilizing effect comprising an effective does of at least about one milligram of 3-methyl-5-[2-(4-phenyl-3,4-dihydropiperidinyl)-ethyl]-2-oxazolidinone together with a pharmaceutically acceptable carrier.

4. A composition of claim 1 useful for its transquilizing effect comprising an effective dose of at least about one milligram of 3-lower-alkyl-5-[2-(4-phenyl-3,4-dihydropiperidinyl)-ethyl]-2-oxazolidinone together with a pharmaceutically acceptable carrier.

5. A composition of claim 1 useful for its tranquilizing effect comprising an effective dose of at least about one milligram of 3,4-dimethyl-5-[2-(4-phenyl-3,4-dihydropiperidinyl)ethyl]-2-oxazolidinone together with a pharmaceutically acceptable carrier.

6. A composition of claim 1 useful for its tranquilizing effect comprising an effective dose of at least about one milligram of 5-[2-(3-phenyl-3,4-dehydropyrrolidinyl)-ethyl]-2-oxazolidinone together with a pharmaceutically acceptable carrier.

7. A composition of claim 1 useful for its tranquilizing effect comprising an effective dose of at least about one milligram of 5-{2-[4-(4-fluorophenyl)-3,4-dehydropiperidinyl]ethyl}-2-oxazolidinone together with a pharmaceutically acceptable carrier.

8. A composition of claim 1 useful for its tranquilizing effect comprising an effective dose of at least about one milligram of 3-methyl-5-{2-[4-(4-fluorophenyl)-3,4-dehydropiperidinyl]-ethyl}-2-oxazolidinone together with a pharmaceutically acceptable carrier.

9. A composition of claim 1 useful for its tranquilizing effect comprising an effective dose of at least about one milligram of 3-lower-alkyl-5-{2-[4-(4-fluorophenyl)-3,4-dehydropiperidinyl]-ethyl}-2-oxazolidinone together with a pharmaceutically acceptable carrier.

10. A composition of claim 1 useful for its tranquilizing effect comprising an effective dose of at least about one milligram of 3,4-dimethyl-5-{2-[4-(4-fluorophenyl)-3,4-dehydropiperidinyl]-ethyl}-2-oxazolidinone together with a pharmaceutically acceptable carrier.

11. A composition of claim 1 useful for its tranquilizing effect comprising an effective dose of at least about one milligram of 3-lower-alkyl-5-{2-[4-(3-trifluoromethylphenyl)-3,4-dehydropiperidinyl]-ethyl}-2-oxazolidinone acid addition salt together with a pharmaceutically acceptable carrier.

12. A composition of claim 1 useful for its tranquilizing effect comprising an effective dose of at least about one milligram of 3-lower-alkyl-5-{2-[4-methoxyphenyl-3,4-dehydropiperidinyl]ethyl}-2-oxazolidinone together with a pharmaceutically acceptable carrier.

13. A process which comprises administering to a living animal body for its tranquilizing effect an effective amount of an active tranquilizing compound which is a 5-omega-substituted 2-oxazolidinone selected from the group consisting of (A) a compound of the formula:

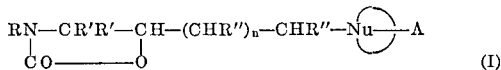
(I)

wherein $n$ is selected from the group consisting of 1 and 2,
wherein R is selected from the group consisting of hydrogen, lower-alkyl, cycloalkyl having up to eight carbon atoms in the ring, phenyllower-alkyl, and substituted phenyllower-alkyl wherein the substituents are selected from the group consisting of halo, lower-alkyl, lower-alkoxy, trifluoromethyl, lower-alkyl-mercapto, di-lower-alkylamino, nitro, and hydroxy, a maximum of 15 carbon atoms being present in any R radical,
wherein R' is selected from the group consisting of hydrogen and methyl,
wherein R" is selected from the group consisting of hydrogen and methyl,
wherein

is a heterocyclic ring selected from the group consisting of 2,3-dehydropyrrolidinyl, 3,4-dehydropyrrolidinyl, 2,3-dehydropiperidinyl, and 3,4-dehydropiperidinyl,
wherein A is phenyl or substituted phenyl attached to a carbon atom of the ring double bond and in the 3 or 4 position of the heterocyclic ring, remaining valences of the carbon atoms of the heterocyclic ring being satisfied by hydrogen and zero through four methyl groups,
wherein phenyl substituents are selected from the group consisting of halo, lower-alkyl, lower-alkoxy, trifluoromethyl, lower-alkylmercapto, di-lower-alkylamino, nitro, and hydroxy, and (B) acid addition salts thereof.

14. A process of claim 13 which comprises administering to a living animal body for its tranquilizing effect an effective amount of 5-[2-(4-phenyl-3,4-dehydropiperidinyl)-ethyl]-2-oxazolidinone.

15. A process of claim 12 which comprises administering to a living animal body for its tranquilizing effect an effective amount of 3-methyl-5-[2-(4-phenyl-3,4-dehydropiperidinyl)-ethyl]-2-oxazolidinone.

16. A process of claim 13 which comprises administering to a living animal body for its tranquilizing effect an effective amount of 3-lower-alkyl-5-[2-(4-phenyl-3,4-dehydropiperidinyl)-ethyl]-2-oxazolidinone.

17. A process of claim 13 which comprises administering to a living animal body for its tranquilizing effect an effective amount of 3,4-dimethyl-5-[2-(4-phenyl-3,4-dehydropiperidinyl)ethyl-2-oxazolidinone.

18. A process of claim 13 which comprises administering to a living animal body for its tranquilizing effect an effective amount of 5-[2-(3-phenyl-3,4-dehydropyrrolidinyl)-ethyl]-2-oxazolidinone.

19. A process of claim 13 which comprises administering to a living animal body for its tranquilizing effect an effective amount of 5-{2-[4-(4-fluorophenyl)-3,4-dehydropiperidinyl]ethyl}-2-oxazolidinone.

20. A process of claim 13 which comprises administering to a living animal body for its tranquilizing effect an effective amount of 3-methyl-5-{2-[4-(4-fluorophenyl)-3,4-dehydropiperidinyl]-ethyl}-2-oxazolidinone.

21. A process of claim 13 which comprises administering to a living animal body for its tranquilizing effect an effective amount of 3-lower-alkyl-5-{2-[4-(4-fluorophenyl)-3,4-dehydropiperidinyl]-ethyl}-2-oxazolidinone.

22. A process of claim 13 which comprises administering to a living animal body for its tranquilizing effect an effective amount of 3,4-dimethyl-5-{2-[4-(4-fluorophenyl)-3,4-dehydropiperidinyl]-ethyl}-2-oxazolidinone.

23. A process of claim 13 which comprises administering to a living animal body for its tranquilizing effect an effective amount of 3-lower-alkyl-5-{2-[4-(3-trifluoromethylphenyl)-3,4-dehydropiperidinyl]-ethyl}-2-oxazolidinone acid addition salt.

24. A process of claim 13 which comprises administering to a living animal body for its tranquilizing effect an effective amount of 3-lower-alkyl-5-{2-[4-methoxyphenyl-3,4-dehydropiperidinyl]-ethyl}-2-oxazolidinone.

References Cited

UNITED STATES PATENTS

| | | | |
|---|---|---|---|
| 2,537,854 | 1/1951 | Plati et al. | 260—297 |
| 3,085,093 | 4/1963 | Meltzer et al. | 260—293 |
| 3,192,222 | 6/1965 | Gross | 260—296 |

ALBERT T. MEYERS, Primary Examiner

S. J. FRIEDMAN, Assistant Examiner

U.S. Cl. X.R.

424—272, 273

UNITED STATES PATENT OFFICE
CERTIFICATE OF CORRECTION

Patent No. 3,513,236          Dated May 19, 1970

Inventor(s) Carl D. Lunsford and William J. Welstead, Jr.

It is certified that error appears in the above-identified patent and that said Letters Patent are hereby corrected as shown below:

| | |
|---|---|
| Column 1-Line 34<br>Appl. Page 1-Line 10 | "5-[(3-and" should read<br>--- 5-[(3 and --- |
| Column 3-Line 44<br>Appl. Page 4-Line 26 | "preferable" should read<br>--- preferably --- |
| Column 5-Line 31<br>Appl. Page 8-Line 8 | "benezenesulfonic" should read<br>--- benzenesulfonic --- |
| Column 5-Line 32<br>Appl. Page 8-Line 8-9 | "trichloroacetic acid" should read<br>--- trichloroacetic acetic --- |
| Column 8-Line 59<br>Appl. Page 14-Line 12 | "preferred" should read<br>--- prepared --- |
| Column 9-Line 4<br>Appl. Page 14-Line 27 | "m." should read<br>--- mm. --- |
| Column 10-Line 2<br>Appl. Page 16-Line 13 | "under pressure" should read<br>--- under reduced pressure --- |
| Column 12-Line 58-59<br>Appl. Page 21-Line 2-3 | "4-(4- and 20 g." should read<br>--- 4-(4-fluorophenyl)-1,2,3,6-<br>tetrahydropyridine hydrochloride,<br>and 20 g. --- |
| Column 17-Line 69<br>Appl. Page 29-Line 25 | "establish" should read<br>--- established --- |

Page -1-

UNITED STATES PATENT OFFICE
CERTIFICATE OF CORRECTION

Patent No. 3,513,236      Dated May 19, 1970

Inventor(s) Carl D. Lunsford and William J. Welstead, Jr.

It is certified that error appears in the above-identified patent and that said Letters Patent are hereby corrected as shown below:

| | |
|---|---|
| Column 18-Line 47<br>Appl. Page 31-Line 6 | "(5) Calcium" Should read<br>--- 5. Dicalcium --- |
| Column 21-Line 8<br>Appl. Page 35-Line 18 | "symmetric" should read<br>--- asymmetric --- |
| Column 23-Claim 15-Line 1<br>Appl. Claim 15-Line 1 | "claim 12" should read<br>--- claim 13 --- |
| Column 24-Claim 17-Line 4<br>Appl. Claim 17-Line 3 | "dehydropiperidinyl)ethyl-2-<br>                should read<br>--- dehydropiperidinyl)ethyl]-2- |

SIGNED AND
SEALED
DEC 8 1970

Page -2-

(SEAL)
Attest:

Edward M. Fletcher, Jr.
Attesting Officer

WILLIAM E. SCHUYLER, JR.
Commissioner of Patents

AHR-39A Div.

UNITED STATES PATENT OFFICE
SUPPLEMENTAL CERTIFICATE OF CORRECTION

Patent No. 3,513,236      Dated May 19, 1970

Inventor(s) Carl D. Lunsford et al.

It is certified that error appears in the above-identified patent and that said Letters Patent are hereby corrected as shown below:

Claim 1
Column 22, Line 12                  "3,4-dihydropyrrolidinyl"

Appl. Claim 1, as amended           should read
  (Response and Amendment
  dated August 13, 1969)           --- 3,4-dehydropyrrolidinyl ---
Page 2, Line 12

Signed and sealed this 3rd day of August 1971.

(SEAL)
Attest:

EDWARD M. FLETCHER, JR.          WILLIAM E. SCHUYLER, JR.
Attesting Officer                  Commissioner of Patents